(12) United States Patent
Nedwed et al.

(10) Patent No.: US 9,320,931 B2
(45) Date of Patent: Apr. 26, 2016

(54) METHOD FOR HYDROCARBON RELEASE MANAGEMENT

(71) Applicants: Timothy J. Nedwed, Houston, TX (US); David A. Palandro, The Woodlands, TX (US); Amy C. Tidwell, Houston, TX (US)

(72) Inventors: Timothy J. Nedwed, Houston, TX (US); David A. Palandro, The Woodlands, TX (US); Amy C. Tidwell, Houston, TX (US)

(73) Assignee: ExxoMobil Upstream Research Company, Houston, TX (US)

( * ) Notice: Subject to any disclaimer, the term of this patent is extended or adjusted under 35 U.S.C. 154(b) by 63 days.

(21) Appl. No.: 14/264,976

(22) Filed: Apr. 29, 2014

(65) Prior Publication Data

US 2014/0357929 A1    Dec. 4, 2014

Related U.S. Application Data

(60) Provisional application No. 61/829,901, filed on May 31, 2013.

(51) Int. Cl.
*A62D 3/40* (2007.01)
*E02B 15/04* (2006.01)

(52) U.S. Cl.
CPC ................ *A62D 3/40* (2013.01); *E02B 15/042* (2013.01)

(58) Field of Classification Search
CPC ........................................................ A62D 3/40
USPC ......................................... 588/321, 320, 405
See application file for complete search history.

(56) References Cited

U.S. PATENT DOCUMENTS

| | | |
|---|---|---|
| 3,885,418 A | 5/1975 | Kriebel |
| 5,045,216 A | 9/1991 | Eller |
| 5,381,442 A | 1/1995 | Brown et al. |
| 2009/0069956 A1 | 3/2009 | Taya et al. |
| 2011/0060551 A1 | 3/2011 | Elhajj |

OTHER PUBLICATIONS www.epa.gov/osweroe1/content/ncp/product_schedule.htm Alphabetical List of NCP Product Schedule Products with Links to Technical Product Summaries, Apr. 2013, 8 pages.
www.epa.gov/osweroe1/content/ncp/products/siltech.htm Siltech OP-40 Technical Product Bulletin #S-6, Jun. 25, 2012, 3 pages.
www.epa.gov/osweroe1/content/ncp/products/thickslick.htm Thickslick 6535 Technical Product Bulletin #S-5, Jun. 29, 2012, 3 pages.

*Primary Examiner* — Edward Johnson
(74) *Attorney, Agent, or Firm* — ExxonMobil Upstream Research-Law Department

(57) ABSTRACT

Method and system is described to enhance operations for managing the hydrocarbon release. The system utilizes remote controlled devices equipped with herder delivery components. The system may utilize herders to perform in-situ burning of the oil slick. This method may provide dedicated remote control device for each response vessel to further enhance the response to oil slicks.

24 Claims, 5 Drawing Sheets

METHOD FOR HYDROCARBON RELEASE MANAGEMENT

CROSS REFERENCE TO RELATED APPLICATIONS

This application claims the benefit of U.S. Provisional No. 61/829,901, filed May 31, 2013 and is incorporated by reference herein in its entirety.

FIELD OF THE INVENTION

This invention relates generally to the field of hydrocarbon operations. Specifically, the invention relates to operations for managing oil releases, which utilize one or more remote controlled devices that is utilized to provide herders to an oil release.

BACKGROUND OF THE INVENTION

In the oil and gas industry, hydrocarbons are accessed via a wellbore to provide a fluid flow path to a processing facility. Some of these hydrocarbon resources are located under bodies of water, such as lakes, seas, bays, rivers and/or oceans, while others are located at onshore locations. To transfer hydrocarbons from such locations, a pipeline and/or one or more different vessels (e.g., ship or tanker trucks) may be utilized through various segments from the wellbore and the processing facility.

Additionally, hydrocarbons may be transferred from a production region to another region for consumption/processing into hydrocarbon-based products or from one hydrocarbon storage location to another. Transfer of hydrocarbons between such locations often requires one or more different vessels and routes over bodies of water, such as lakes, seas, bays, rivers and/or oceans.

Offshore leaks and/or spills may be problematic due to the hydrocarbons being released into a body of water. Typically, the hydrocarbons may form a slick on the surface of the water, which may be referred to as an oil slick. Various response techniques may be utilized to manage the oil slick. For instance, chemicals may be added to the oil slick and mixed with the oil slick to break apart the hydrocarbons. In other situations, the oil slick may be ignited to burn off the oil slick or mechanical recovery may be utilized to capture the hydrocarbons.

In managing an oil slick, one response option for a marine oil spill is to ignite and burn the oil slicks in situ. In situ burning (ISB) involves oil slicks that are thick enough to burn. Typically, oils naturally spread after spilling on a large water surface to a thickness that is too thin to sustain combustion. Typically, oil slicks have to be greater than 1 millimeter (mm) to sustain combustion. This is because oil slicks thinner than 1 mm, in general, lose too much heat to the water column and self-extinguish. Oil slicks thicker than 1 mm provide enough insulation from heat loss to the water below so that combustion can be maintained once a slick is ignited. The thicker an oil slick results in a more efficient combustion because the burn continues until the oil slick thins to about 1 mm or less.

Conventional approaches for ISB is to use fire-resistant booms. These booms are large pieces of equipment that involve significant amounts of time to transport from a stockpile location to an oil spill site. This time delay may be further compounded when the booms are transported between individual oil slicks, which may occur if the oil slick breaks into different sections. The challenge of transporting fire-resistant booms combined with limited availability has resulted in ISB being an operational tool for a limited amount of offshore oil spills. The problem with convention methods is that the response time associated with booms is not efficient enough to provide a rapid response for conducting ISB.

Another response option is to use herders instead of physical booms. Herders are composed of surfactants dissolved in a solvent. Spraying the herder on the water around the perimeter of an oil slick changes the surface tension of the water (from about 70 dynes/centimeter (cm) to <40 dynes/cm) thereby causing the oil to contract into a smaller area. This contraction results in the oil slick becoming thicker. The current process for spraying herders is to load a spray application system and a supply of herders onto a boat. The boat then moves to an oil spill location and applies the herder to the water surface around the perimeter of the oil slick. For the oil slick to have maximum contraction and thickening, it is important to spray herder onto the water surface avoiding overspray onto the oil itself.

As the management of hydrocarbon leaks and spills is a time consuming operation, a need exists to enhance operations to manage hydrocarbon releases with enhanced methods and systems. In particular, a need exists for a method that is more efficient and may be deployed rapidly to different locations to conduct ISB of oil slicks.

SUMMARY OF THE INVENTION

In an embodiment, a method for managing an oil release with one or more remote controlled devices is described. The method comprises: deploying a remote controlled device to a location near an oil slick; deploying herders around at least a portion of the perimeter of the oil slick via the remote controlled device; and igniting the oil slick with one or more incendiary devices. The method may include deploying a vessel having the remote controlled device to a location in a body of water near the oil slick; and wherein the deploying the remote controlled device is from the vessel. The vessel is a manned ship or a manned aircraft.

In another embodiment, a hydrocarbon release management system is described. The systems comprises: a command unit; and a remote controlled device in communication with the command unit and having a propulsion component, herder delivery component and an incendiary herder delivery component, wherein the propulsion component is configured to maneuver the remote controlled device, the herder delivery component is configured to deploy the herder near the oil slick and the incendiary herder delivery component is configured to provide one or more incendiary devices to the oil slick. The system may also include a communication component in the remote controlled device that is configured to communicate signals associated with the deployment of the herders and the deployment of the incendiary devices to the command unit. Also, the remote controlled device may also include a measurement component that is configured to measure the thickness of the oil slick and to communicate signals associated with the measured thickness to the command unit.

In yet another embodiment, a method for managing an oil release with one or more remote controlled ships is described. The method comprises: outfitting the remote controlled ships with a supply of herder and an application system; outfitting the remote controlled ships with a supply of incendiary devices and a delivery system; outfitting the remote controlled ships with a remote-detection system that to provide real-time remote observation of the environment around the one or more remote controlled ships; deploying a vessel having at least one of the one or more remote controlled ships to a location in a body of water near an oil slick; maneuvering the at least one of the one or more remote controlled ships to a location on the perimeter of an oil slick; applying the herder while maneuvering the remote controlled ship around the perimeter of the oil slick; interrupting the spraying of the herders after the perimeter has been circled once; maneuvering the at least one of the one or more remote controlled ships to observe the oil slick until it reaches an threshold size; and igniting the oil slick with one or more incendiary devices.

In yet still another embodiment, a method of managing a hydrocarbon release is described. This method comprises: deploying a manned aircraft to a location near an oil slick; deploying herders around at least a portion of the perimeter of the oil slick via the aircraft device; and igniting the oil slick with one or more incendiary devices deployed from the aircraft device.

In another embodiment, a hydrocarbon release management system is described. The system comprises: a manned aerial platform; the manned aerial platform having: a propulsion component configured to move the manned aerial platform from a first location to a second location; and a remote controlled device storage component configured to store one or more remote controlled devices; and one or more remote controlled devices configured to be disposed on the manned aerial platform; each of the one or more remote controlled devices configured to have: a propulsion component configured to move the remote controlled devices from a first location to a second location; a herder delivery component configured to deploy herders; and an incendiary delivery component configured to apply one or more incendiary devices to an oil slick.

In yet another embodiment, the hydrocarbon release management system may include a manned aircraft (e.g., an aerial platform, such as a helicopter, airplane, or dirigible) that is fitted with one or more remote controlled devices (e.g., a helicopter, airplane, dirigible, or boat). The manned aircraft may fly to the location of one or more oil slicks and deploy the one or more remote controlled devices. The devices are then operated from the manned aircraft to detect oil slick locations, apply herder, apply one or more incendiary devices, observe the burning of the oil slick, monitor the oil slick and identify other oil slicks.

BRIEF DESCRIPTION OF THE DRAWINGS

The foregoing and other advantages of the present disclosure may become apparent upon reviewing the following detailed description and drawings of non-limiting examples of embodiments.

DETAILED DESCRIPTION OF THE PREFERRED EMBODIMENTS

Figure 1A:
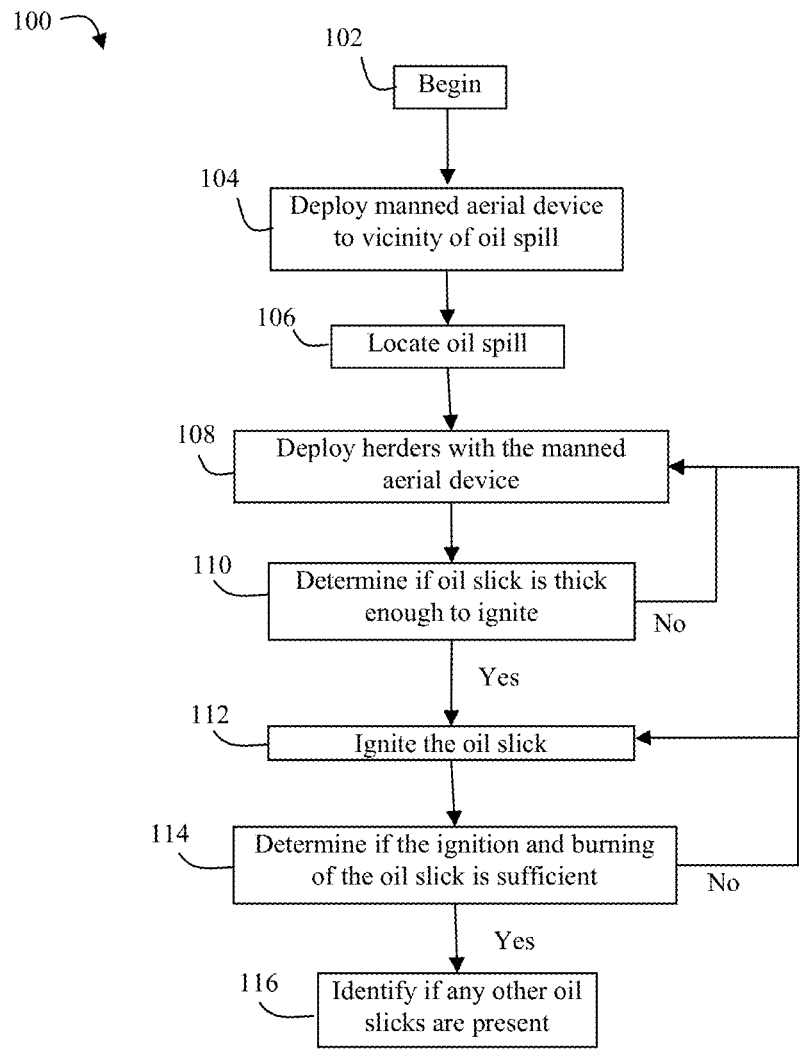
FIGS. 1A and 1B are flow charts for performing mobile hydrocarbon release management in accordance with exemplary embodiments of the present techniques.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

The present disclosure describes one or more mobile device system and method for oil release management. With this mobile hydrocarbon response system, one or more response vessels may include one or more manned or remote controlled devices that include propulsion components and herder delivery components. The herder delivery components may be utilized to provide herders to the oil slick, while the propulsion components provide a means to move the manned or remote controlled device from one location to another location. These mobile devices may also include communication components, incendiary delivery components and measurement components to enhance operation of the system. As an exemplary embodiment, the mobile device may be a manned aircraft (e.g., helicopter or airplane) or a remote-controlled device (e.g., helicopter or a remote controlled boat).

Beneficially, the manned aircraft system is an enhancement over the current system of applying herders by boat because of significantly greater speed and resulting efficiency. The manned aircraft may be fitted with a supply of herders and a delivery system, and may also be fitted with a supply of incendiary devices for igniting oil slicks after the herders have been deployed. Herders are effective on marine waters, brackish water, and fresh water. As a result, the herders may be utilized for different types of bodies of water. The application rate for herders may be 5 L/kilometer, but more or less could be effective. In certain applications, the amount of herder may be 10 to 100 times less product than if the same oil slick was being treated with dispersant.

Further, ail slicks are extremely dynamic with the slick rapidly spreading, weathering, breaking into smaller slicks, and stranding on shorelines. Each of these events can result in the slick becoming more challenging to treat. Rapid response to an oil spill may limit the environmental impact because oil spills can happen at locations that are remote from response equipment. Because most aircraft can travel at speeds more than an order of magnitude greater that boats, the aircraft can respond before slicks have undergone processes that are detrimental to certain operations.

In one embodiment of the present techniques, herders are loaded into a manned aircraft (e.g., helicopter or airplane) that also contains a mechanism to drop incendiary devices on oil slicks after they have been herded. Applying herders from the manned aircraft enhances the oil spill response because the speed of response is based on the speed of the aircraft and not the speed of a boat.

However, manned aircraft do present certain problems. For example, the safety of the personnel and the expense of the manned aircraft is a primary concern. That is, the personnel in a manned aircraft are involved in a challenging operation that presents certain risks. Also, the manned aircraft are expensive to maintain, operate, and have to be deployed from certain types of locations (e.g., land bases or larger marine vessels).

Further still, some oils that could be spilled to a water surface contain hazardous components such as hydrogen sulfide. Hydrogen sulfide is acutely toxic in very low concentrations. Thus, it may not be possible to have personnel in the vicinity of a spill of oil that contains hydrogen sulfide.

As another embodiment, the present techniques can also be utilized to replace a manned aircraft with a remote-controlled airborne device (e.g., a helicopter, a plane, or a dirigible) or a remote controlled ship. These remote controlled devices are fitted with a supply of herders, and may also be equipped with a supply of incendiary devices for igniting oil slicks after the herders have been deployed. The remote controlled devices can be deployed from a manned ship, or a manned aircraft (helicopter, airplane, or dirigible).

The remote controlled devices may also include additional components to further enhance the operations. For example, the device may include one or more cameras (which may be visual, infrared, other suitable techniques or a combination of techniques) or other measurement components to assist with identification of the location of an oil slick and to observe the herding and burning process and that can transmit this data back to a remote location. In certain embodiments, the system and method may also include one or more different measurement components utilized to determine the thickness of the oil slick. Each of these measurement components may include different techniques to obtain measurements associated with the thickness of the oil slick. These techniques may include using the down wash of the airborne detection device to clear the area within the oil slick, recording the time period to clear the area and comparing the clearing time to predetermined tables that correlate clearing time to oil slick thickness. Another technique may include dropping a single-use Secchi-type disk (or similarly visible object) into the oil slick, measuring the amount of time required for the helicopter cameras to lose sight of the disk, and comparing the time to predetermined tables that correlate this time to oil slick thickness. Yet another technique includes dropping an accelerometer located on a retractable line into the oil slick, measuring the amount of time required for the accelerometer to pass through the oil slick, and comparing the time to predetermined tables that correlate this time to slick thickness. The accelerometer is used multiple times by repeatedly deploying and retracting via the retractable line. In another similar technique, a small visible weight is dropped into the oil slick, the amount of time for it to pass through the oil slick based on the loss of visibility is measured, the object is retracted back out of the oil slick and the time to loss of visibility is compared to predetermined tables that correlate this time to slick thickness. In yet another technique, a sample tube open at both ends is dropped until it extends from above the oil slick to a location below the oil slick, the ends of the sample tube are then closed via a remote actuation device, the tube is retracted from the oil slick and an image of the tube may be obtained to directly determine slick thickness. Further, another technique may include dropping an imaging camera into the oil slick to photograph a profile of the air-oil-water interfaces to directly determine slick thickness. The camera is located on a retractable line allowing rapid image of multiple areas of a slick and/or multiple slicks. A conductivity probe located on a retractable line to measure the resistance of the water and oil slick phases to determine slicks thickness.

Beneficially, the remote controlled devices may provide various enhancements to conventional oil management techniques. For example, unmanned, remote controlled airborne devices or ships are inherently safer than manned vessels, less expensive to operate and maintain, and require minimal infrastructure to operate. As a result, more devices may be utilized, may be deployed to a larger area and may be used from a larger variety of locations (e.g., different sized marine vessels and other relatively fixed locations). In particular, remote controlled devices can be small enough to launch from marine vessels that are not equipped to handle larger manned aircraft. Further, multiple remote controlled devices may be associated with a single marine vessel. That is, one oil spill response vessel may be used to provide supplies and operations for a plurality of remote controlled devices. Various aspects of the present techniques are described further in FIGS. 1A to 6.

FIG. 1A is a flow chart 100 for performing hydrocarbon release management in accordance with a first exemplary embodiment of the present techniques. This flow chart 100 includes a preparation and deployment stage, which includes blocks 102, 104, and 106, followed by a response stage, which includes blocks 108, 110, 112, 114 and 116. In this response stage, the manned aerial device is used to measure, to herd, and to ignite the oil slick.

The process begins with the preparation and deployment stage, which prepares the equipment and deploys the equipment to the oil spill location. The process begins at block 102. Then, at block 104, the one or more manned aerial device is deployed. The deployment may include fitting the manned aerial device with a stockpile of herder; fitting the manned aerial device with a delivery system for deploying the herders to the water surface, fitting the manned aerial device with a separate system for dropping incendiary devices onto the oil slick. Either prior to or once the manned aerial device is deployed, the oil spill may be located, as shown in block 106. Locating the oil spill may include aerial reconnaissance or identification from marine vessels, platforms or other suitable means.

After the preparation and deployment stage, the response stage is performed, as noted in blocks 108, 110, 112, 114 and 116. The manned aerial device is used to deploy the herders onto the water surface around the perimeter of the oil slick, as shown in block 108. That is, the manned aerial device is moved to a location in the vicinity of an oil slick floating on the body of water and then the manned aerial device sprays the water surface around the perimeter of the oil slick with herders. The deployment of the herders should be performed in a manner that lessens the application of the herders onto the surface of the oil. The oil slick contracts and thickens after the perimeter is sprayed with the herders. Also, the deployment of herders includes fitting the manned aerial device with a stockpile of herders and a system for delivering the herder to the water surface; and/or fitting the manned aerial device with a separate system for dropping incendiary devices onto an oil slick. The herders may include any type of surface active compound able to be delivered from an aerial platform and able to reduce the surface tension of marine, brackish, or fresh water. As an example, the herders may include Siltech OP-40 or Thickslick 6536 (both manufactured by Desmi—Applied Fabric Technologies, Inc.), which are both listed on the USEPA's National Contingency Plan National Product Schedule for potential use in waters of the USA and considered to be surface collecting agents. See e.g., U.S. Environmental Protection Agency on the Emergency Management page at <http://www.epa.gov/osweroe1/content/ncp/product_schedule.htm>>, visited on May 29, 2013.

Once the herders are deployed, a determination is made whether the oil slick is thick enough to ignite, as shown in block 110. This determination may include deploying the remote controlled device to measure the thickness of the oil slick. The thickness determination may include determining if the oil slick has a thickness of greater than 0.1 mm, 0.5 mm, 1.0 mm, 2.0 mm, or more. If the oil slick is not thick enough, then the herders may be deployed again as noted in block 108. If the oil slick is thick enough, the oil slick may be ignited, as shown in block 112. The oil slick may be ignited with one or more incendiary devices, which may be provided to the oil slick from the manned aerial device. As an example, the manned aerial device (e.g., a helicopter) may be flown to a location that is near the upwind edge of the oil slick. Then, the one or more incendiary devices may be dropped into the oil slick to ignite the oil slick. The one or more incendiary devices may include torches, flares, lasers, gelled gasoline, gelled kerosene, or any other appropriate ignition system.

Once ignited, a determination is made whether the ignition and burning of the oil slick is sufficient, as shown in block 114. This determination may include deploying the manned aerial device to monitor the ignition of the oil slick and/or deploying the manned aerial device to assess the thickness of any remaining oil slick (e.g., once the burning of the oil slick is complete). If the ignition and burning of the oil slick is not sufficient, the oil slick may be ignited again in block 112 or the method may repeat the steps of deploying the herders, determining if the oil slick is thick enough to ignite, and igniting the oil slick, as shown in blocks 108 to 112. However, if the ignition of the oil slick is sufficient, an identification of any other oil slicks may be performed, as shown in block 116. The identification of any other oil slicks being present may include communicating with other locations to obtain the location of other oil slicks and/or utilizing the manned aerial device to identify other oil slick locations. If other oil slick locations are identified, the process may be repeated for the other oil slicks, such as shown in blocks 108 to 116. If other oil slicks are not identified, the marine vessel may return to the deployment location.

Figure 1B:
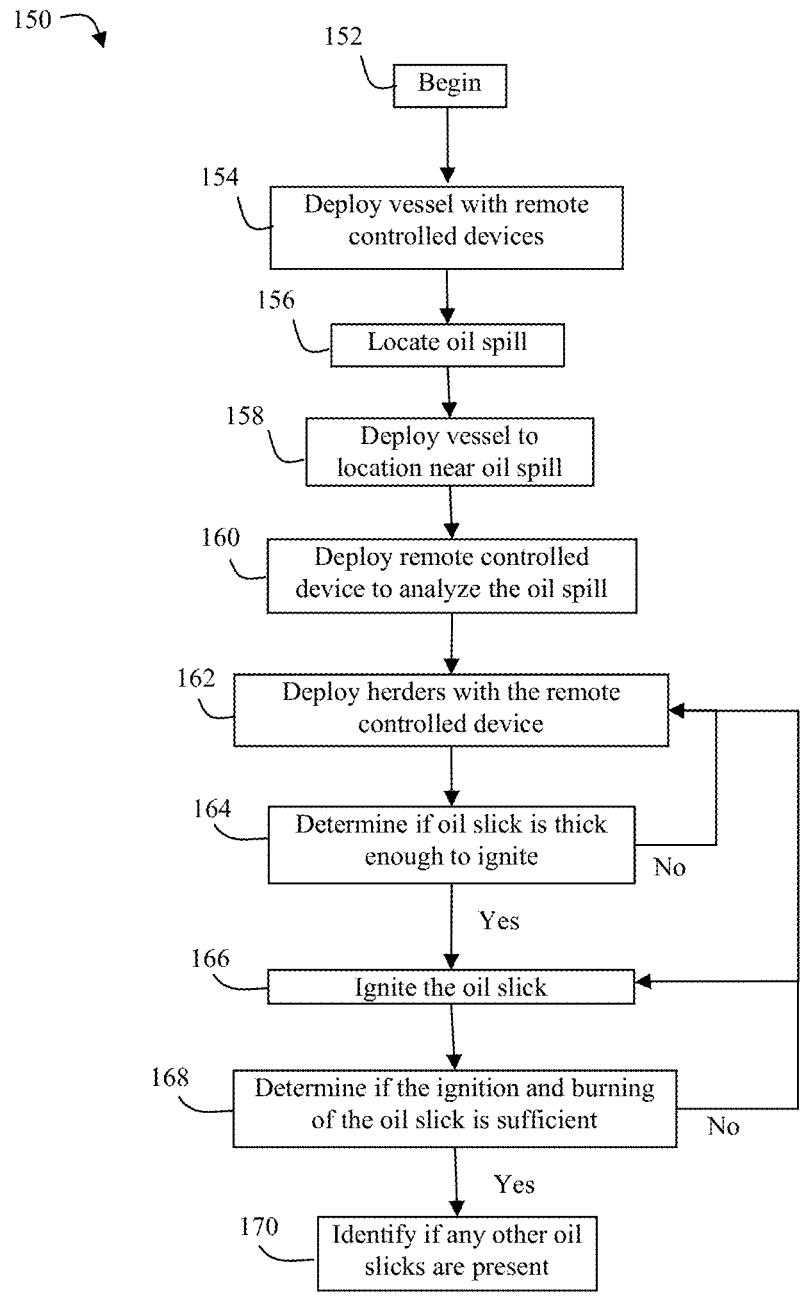

FIG. 1B is a flow chart 150 for performing hydrocarbon release management in accordance with a second exemplary embodiment of the present techniques. This flow chart 150 includes a preparation and deployment stage, which includes blocks 152, 154, 156 and 158, followed by response stage, which includes blocks 160, 162, 164, 166 and 168 and 170. In this response stage, the remote controlled device is used to measure, to herd, and to ignite the oil slick.

The process begins with the preparation and deployment stage, which prepares the equipment and deploys the equipment to the oil spill location. The process begins at block 152. Then, at block 154, the vessel (e.g., a ship or aircraft) with one or more remote controlled devices is deployed. The deployment of the ship may include fueling the ship, loading the one or more remote controlled devices onto the ship and moving the ship from port. The deployment may also include selecting the measurement components to be utilized with the remote controlled device and selecting the herders to be utilized for the oil slick. Further, the deployment may include fitting the remote controlled device with a stockpile of herder; fitting the remote controlled device with a delivery system for deploying the herders to the water surface, fitting the remote controlled device with a separate system for dropping incendiary devices onto the oil slick. Either prior to or once the vessel is deployed, the oil spill may be located, as shown in block 156. Locating the oil spill may include aerial reconnaissance or identification from marine vessels or platforms or other suitable means. Then, the vessel is deployed to a location near the oil spill, as shown in block 158. This location may be communicated to the ship. The deployment of the ship may include transporting the remote controlled devices to a location near that indicated in the communication.

After the preparation and deployment stage, the response stage is performed, as noted in blocks 160, 162, 164, 166 and 168 and 170. In block 160, the remote controlled device may be deployed from the ship to analyze the oil spill. This may involve controlling the remote detection device (e.g., a remote controlled airborne device or remote controlled marine device) to locate the oil slick and move the device above the oil slick to a specific location. That is, the airborne detection device, which may be a remote controlled helicopter, as an example, may fly to a location above the oil slick. Then, the thickness of the oil slick may be measured by the device. The airborne detection device may be configured to transmit information within a set time window (e.g., every 10 seconds, 60 seconds, 5 minutes, or even 10 minutes), transmit information when polled by the command unit, or transmit information when after each measurement has been collected.

As an example, the measurement techniques utilized by the remote controlled device may include one or more of the techniques described in Intl. Patent Application No. PCT/US2013/032994, which is hereby incorporated by reference in its entirety. These techniques may include hovering the remote controlled device over a specific location in the oil slick and performing one or more of the measurement techniques. These measurement techniques may include one or more different measurement components utilized with the remote controlled device to determine the thickness of the oil slick. These techniques may include using the down wash of the airborne remote controlled device to clear the area within the oil slick, recording the time period to clear the area and comparing the clearing time to predetermined tables that correlate clearing time to oil slick thickness. Another technique may include dropping a single-use Secchi-type disk (or similarly visible object) into the oil slick, measure the amount of time required for the remote controlled device cameras to lose sight of the disk, and compare the time to predetermined tables that correlate this time to oil slick thickness. In yet another technique, an accelerometer is dropped into the oil slick to measure the amount of time required for the accelerometer to pass through the oil slick, retracted via a line out of the oil slick, and the time is compared to predetermined tables that correlate this time to slick thickness. In another similar technique, a small visible weight is dropped into the oil slick, the amount of time for it to pass through the oil slick based on the loss of visibility is measured, the object is retracted back out of the oil slick and the time to pass through the slick is compared to predetermined tables that correlate this time to slick thickness. In yet another technique, an open-ended sample tubes is dropped until it extends from above the oil slick to a location below the oil slick, the sample tube ends are closed via a remote actuating device, the tube is retracted from the oil slick and an image of the tube may be obtained to directly determine slick thickness. Further, another technique may include dropping an imaging camera via a retractable line into the oil slick to photograph a profile of the air-oil-water interfaces; the camera captures the image allowing direct determination of oil slick thickness. In yet another technique, a conductivity probe is deployed via a retractable line into the oil slick to measure the resistance of the oil and water phases. This resistance is compared to predetermined tables that correlate resistance to slick thickness. These may include determining to utilize one or more of the different techniques.

Then, if the oil slick has been analyzed, the remote controlled device is used to deploy the herders around the oil slick, as shown in block 162. The deployment of herders may include dispersing the herders onto the water surface around the perimeter of the oil slick. The deployment of the herders may include spraying the herders from the remote controlled device. That is, the remote controlled device is moved to a location in the vicinity of an oil slick floating on the body of water and then the remote controlled device sprays the water surface around the perimeter of the oil slick with herders. The type of movement may depend on the remote controlled device (e.g., an airborne remote controlled device may be flown around the oil slick, while a marine remote controlled device may be navigated around the oil slick). The deployment of the herders should be performed in a manner that lessens the application of the herders onto the surface of the oil. The oil slick contracts and thickens after the perimeter is sprayed with the herders. Also, the deployment of herders may include fitting the remote controlled device with a stockpile of herders and a system for delivering the herder to the water surface; and/or fitting the remote controlled device with a separate system for dropping incendiary devices onto an oil slick. This may be performed on the marine vessel or prior to deployment of the marine vessel. The herders may include any type of surface active compound able to be delivered from an aerial platform and able to reduce the surface tension of marine, brackish, or fresh water.

Once the herders are deployed, a determination is made whether the oil slick is thick enough to ignite, as shown in block 164. This determination may include deploying the remote controlled device to measure the thickness of the oil slick. This may be performed by any one of the techniques noted above in the discussion of block 160. The thickness determination may include determining if the oil slick has a thickness of greater than 0.1 mm, 0.5 mm, 1.0 mm, 2.0 mm, or more. If the oil slick is not thick enough, then the herders may be deployed again as noted in block 162. If the oil slick is thick enough, the oil slick may be ignited, as shown in block 166. The oil slick may be ignited with one or more incendiary devices, which may be provided to the oil slick from the remote controlled device. As an example, the airborne remote controlled device (e.g., a helicopter) may be flown to a location that is near the upwind edge of the oil slick. Then, the one or more incendiary devices may be dropped into the oil slick to ignite the oil slick. The one or more incendiary devices may include torches, flares, lasers, gelled gasoline, gelled kerosene, or any other appropriate ignition system.

Once ignited, a determination is made whether the ignition and burning of the oil slick is sufficient, as shown in block 168. This determination may include deploying the remote controlled device to monitor the ignition of the oil slick and/or deploying the remote controlled device to measure the thickness of any remaining oil slick (e.g., once the burning of the oil slick is complete). The measurement of the oil slick may utilize any of the techniques noted above. If the ignition and burning of the oil slick is not sufficient, the oil slick may be ignited again in block 166 or the method may repeat the steps of deploying the herders, determining if the oil slick is thick enough to ignite, and igniting the oil slick, as shown in blocks 162 to 166. However, if the ignition of the oil slick is sufficient, an identification of any other oil slicks may be performed, as shown in block 170. The identification of any other oil slicks being present may include communicating with other locations to obtain the location of other oil slicks and/or utilizing the remote controlled device to identify other oil slick locations. If other oil slick locations are identified, the process may be repeated for the other oil slicks, such as shown in blocks 156 to 170. If other oil slicks are not identified, the marine vessel may return to the deployment location.

Figure 2:
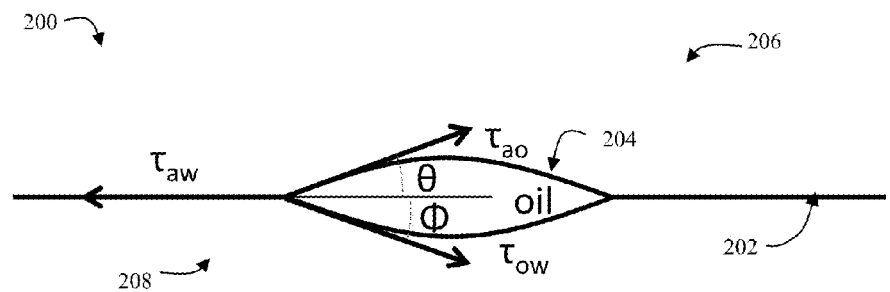
FIG. 2 is an exemplary diagram of the operation of herders.

FIG. 2 is an exemplary diagram 200 of the forces acting on an oil slick. The active ingredient in any herder formulation is a surfactant. Applying a surfactant to the water surface 202 on the perimeter of a thin oil slick 204 reduces the air-water surface tension ($\tau_{aw}$), where the air is 206 and the water is 208. If the air-oil surface tension ($\tau_{ao}$) and the oil-water interfacial tension ($\tau_{ow}$) remain unchanged, the balance of interfacial forces results in the angles θ and Φ increasing as shown in equation e1 below.

$$\tau_{aw} = \tau_{ao} \cos\theta + \tau_{ow} \cos\Phi \qquad (e1)$$

Thus, herders can be considered an edge effect, which allows them to work without the need for a boundary "to push" against. As such, herders are an agent that reduces the air-water surface tension, and may be in liquid phase.

Figure 3:
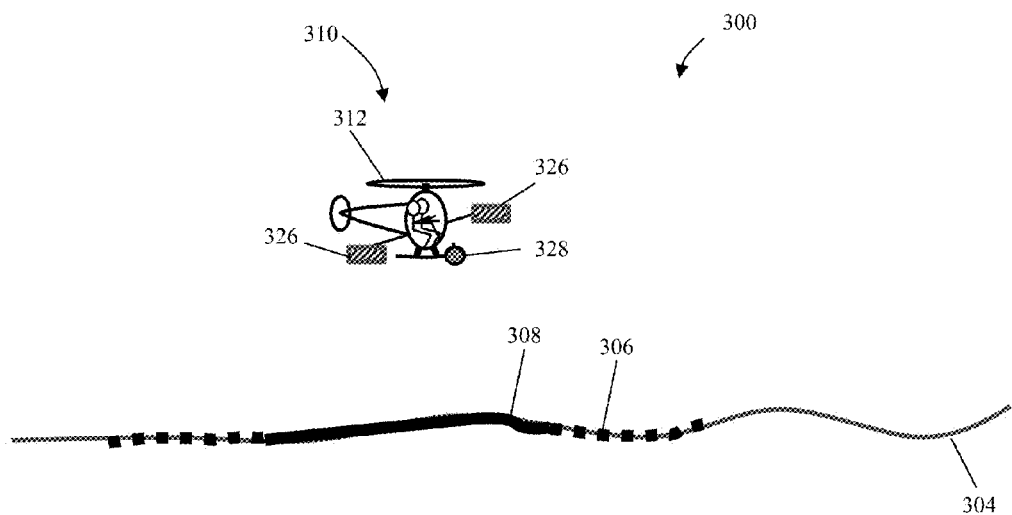
FIG. 3 is a diagram of an airborne hydrocarbon release management system 300 in accordance with an exemplary embodiment of the present technique.

FIG. 3 is a diagram of an airborne hydrocarbon release management system 300 in accordance with an exemplary embodiment of the present technique. The airborne hydrocarbon release management system 300 may include one or more manned aerial devices, such as manned aerial device 310. The manned aerial device 310 may be deployed to the location of an oil slick 308 to apply herder 306 around the perimeter of the oil slick 308 via one or more herder delivery components 326. The oil slick 308 may be ignited via an incendiary delivery component 328. Also, the manned aerial devices may be utilized to assess the thickness of the oil slick 308 at various locations and/or to monitor the ignition of the oil slick 308.

Each manned aerial device may include propulsion components 312 to maintain the device above the water 304, herder delivery components 326 to store and apply herder; and incendiary delivery component 328 to provide the incendiary devices to the oil slick 308. The propulsion components 312 may be utilized to both maneuver the airborne remote controlled device 310 and power the herder delivery components 326 and incendiary delivery component 328. These power components may include a battery and/or solar powered equipment. The different components or modules may be powered from the power component or may include separate power sources for each of the respective components or modules. Also, the different components and modules may also utilize a separate power source as a redundant power supply in certain embodiments.

The herder delivery components 326 may include a storage component, a pump component, transfer piping components, one or more boom components, and nozzle components. The storage component holds a stock of herder and may be located internal or external to the manned aerial device. The pump component is used to transfer the herder from the storage component to the boom component via the transfer piping components. The boom component is located external to the manned aerial device and is fitted with one or more nozzle components. The nozzle components are used to spray the herder from the manned helicopter device onto the oil slick 308. The specific configuration of the components and material utilized for the components may vary depending upon the design preferences and herders, which are known to those skilled in the art.

Alternatively, the herder delivery components 326 may include a storage component, a pump component, transfer piping components, a coiled tubed component, and a nozzle component. The storage component holds a stock of herder and may be located internal or external to the manned aerial device. The pump component is used to transfer the herder component from the storage component to the coiled tubing component via the transfer piping components. The coiled tubing component may include flexible tubing that is wound around a reel to provide storage of a significant length of tubing. The coiled tubing component is located internal the manned aerial device. One end of the coiled tubing component is connected to the transfer piping components, and the other end is connected to a nozzle component. The nozzle component is used to spray the herder from the manned helicopter device via the coiled tubing onto the oil slick 308. The coiled tubing component allows the entirety of the herder delivery components to be located internal to the manned aerial device when not in use. To spray herder, the coiled tubing component is unreeled from its reel to extend the nozzle to less than (<) 1 inch from the water surface, <1 foot from the water surface, <10 feet from the water surface, or greater than 10 feet from the water surface.

The incendiary delivery component 328 may be a slung system, a handheld flare fitted with a buoyancy system, a laser, solid metallic sodium, solid metallic potassium, potassium permanganate/ethylene glycol mixture, or other appropriate incendiary system known to those skilled in the art. Each of these incendiary devices can be mounted external or internal to the manned aerial device. As a specific example, the incendiary delivery component 328 may be a slung system, such as Simplex Helitorch manufactured by Simplex Aerospace. This slung system may reside entirely external to the manned helicopter. The system is activated to drip ignited gelled gasoline, gelled kerosene, gelled diesel, or combinations of each onto the thickened oil slick. Activation is via a control switch operated by the manned aerial device operator or a separate operator.

Figure 4:
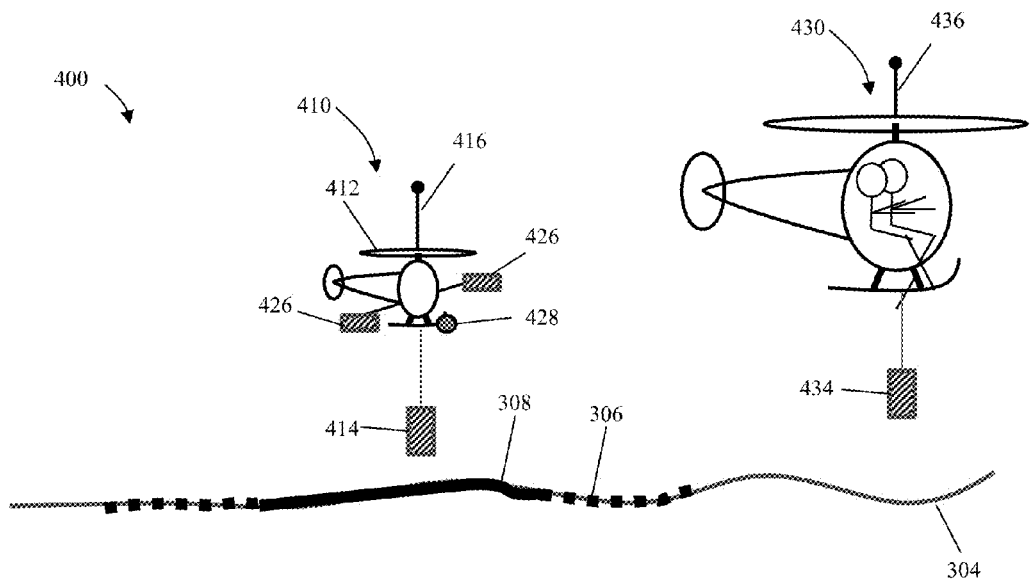
FIG. 4 is a diagram of an airborne hydrocarbon release management system in accordance with a second exemplary embodiment of the present technique.

FIG. 4 is a diagram of an airborne hydrocarbon release management system 400 in accordance with a second exemplary embodiment of the present technique. The airborne hydrocarbon release management system 400 may include one or more remote controlled devices, such as airborne remote controlled device 410, which are in communication with a command unit 436, which is shown disposed on a manned aerial device 430. The remote controlled device may be deployed from the manned aerial device 430, which is disposed above a body of water 304. The manned aerial device is fitted with a system to carry, deploy, and collect one or more remotely controlled devices 410, such as a device storage component 434, and fitted with a command unit 436. The manned aerial device 430 and the remote controlled device 410 may be deployed to the location of an oil slick 308 to apply herder 306 around the perimeter of the oil slick 308 via herder delivery components 426. The oil slick 308 may be ignited via an incendiary delivery component 428. Also, the remote controlled devices may be utilized to determine the thickness of the oil slick 308 at various locations and/or to monitor the ignition of the oil slick 308 via one or more measurement components 414.

Each remote controlled device may include propulsion components 412 to maintain the airborne detection device above the water 304, herder delivery components 426 to store and apply herder; and incendiary delivery component 428 to provide the incendiary devices to the oil slick 308. In addition, the remote controlled device may optionally include a communication component 416 that is configured to communicate with the command unit 436 and calculate the thickness of the oil slick and measurement components 414 that are configured to measure the spatial distribution and the thickness of the oil slick. The propulsion components 412 may be utilized to both maneuver the airborne remote controlled device 410 and power the measurement components 414, communication component 416, herder delivery components 426 and incendiary delivery component 428. These power components may include a battery and/or solar powered equipment. The different components or modules may be powered from the power component or may include separate power sources for each of the respective components or modules. Also, the different components and modules may also utilize a separate power source as a redundant power supply in certain embodiments.

The herder delivery components 426 may include a storage component, a pump component, transfer piping components, one or more boom components, and nozzle components. Alternatively, the herder delivery components 426 may include a storage component, a pump component, transfer piping components, a coiled tubed component, and a nozzle component. These components may be similar to the components in the embodiments of the components 326 of FIG. 3. The components may be scaled to a different size and dimensions for the remote controlled device 410.

The incendiary delivery component 428 may be a slung system, handheld flare fitted with a buoyancy system, a laser, solid metallic sodium, solid metallic potassium, potassium permanganate/ethylene glycol mixture, or other incendiary device known to those skilled in the art. Each of these incendiary devices can be mounted external, internal or a combination thereof to the remote controlled device 410.

The measurement components 414 may include various different measurement components to perform one or more of the measurement techniques. These may include one or more high definition (HD) cameras, infrared (IR) cameras, wench components (to lower and retract thickness measurement components) and other suitable equipment. Thickness measurements components may include one or more of multiple single-use Secchi discs, a visible weight mounted on a retractable line, open ended sample tubes mounted on a retractable line, a profiling camera mounted on a retractable line, and/or a conductivity probe mounted on a retractable line.

The communication components 416 may include communication equipment that is utilized with one or more antennas to communicate with one or more of other remote controlled devices, internal components or modules, and/or the command unit 436. The communication equipment may utilize technologies, such as radio, cellular, wireless, microwave or satellite communication hardware and software. Also, the communication equipment may include and utilize any of a variety of known protocols to manage the exchange of information (e.g., Ethernet, TCP/IP, and the like). The communication equipment utilized may depend on the specific deployment locations and configuration. For example, if two or more airborne detection devices are located in close proximity to each other, one airborne detection device may include satellite communication equipment along with radio or wireless communication equipment, while the other airborne detection devices may include only radio or wireless communication equipment. In this manner, the remote controlled device with the satellite communication equipment may handle communication to the command unit 436 for the other airborne detection devices.

Figure 5:
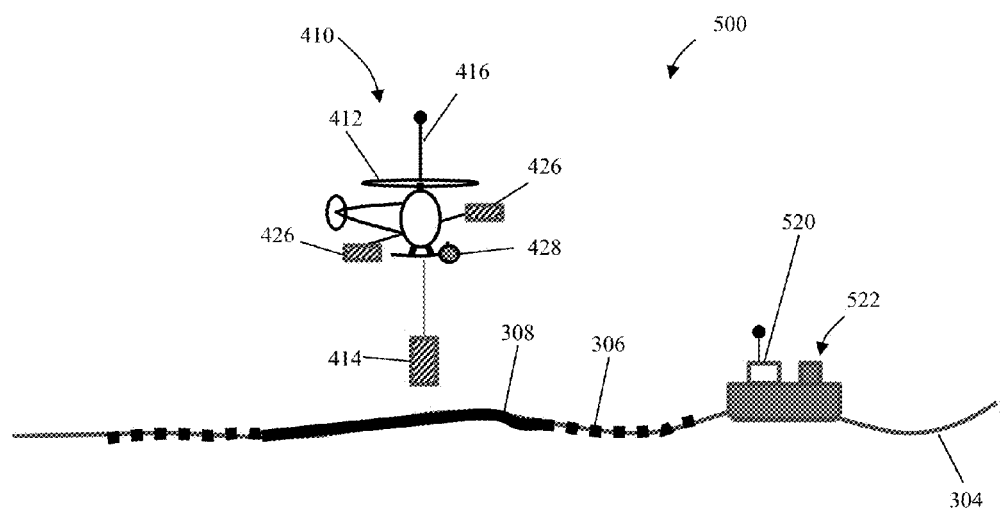
FIG. 5 is a diagram of an airborne hydrocarbon release management system 500 in accordance with a third exemplary embodiment of the present technique.

FIG. 5 is a diagram of an airborne hydrocarbon release management system 500 in accordance with a third exemplary embodiment of the present technique. The airborne hydrocarbon release management system 500 may include one or more remote controlled devices, such as airborne remote controlled device 410, which are in communication with a command unit 520, which is shown disposed on a ship 522. The airborne remote controlled device 410 may operate and include the similar components to those described above in the discussion of FIG. 4, such as propulsion components 412, measurement components 414, communication component 416, herder delivery components 426 and incendiary delivery component 428. The remote controlled device may be deployed from the ship 522, which is disposed above a body of water 504. The ship 522 is fitted with a system to carry, deploy, and collect one or more remotely controlled devices 410 and fitted with a command unit 520. The ship 522 and the remote controlled device 410 may be deployed to the location of an oil slick 308 to apply herder 306 around the perimeter of the oil slick 308 via herder delivery components 426. The oil slick 308 may be ignited via an incendiary delivery component 428. Also, the remote controlled devices may be utilized to determine the thickness of the oil slick 308 at various locations and/or to monitor the ignition of the oil slick 308 via one or more measurement components 414.

The communication components 516 may include communication equipment that is utilized with one or more antennas to communicate with one or more of other airborne detection devices, internal components or modules, and/or the command unit 520. The communication equipment may utilize technologies, such as radio, cellular, wireless, microwave or satellite communication hardware and software. Also, the communication equipment may include and utilize any of a variety of known protocols to manage the exchange of information (e.g., Ethernet, TCP/IP, and the like). The communication equipment utilized may depend on the specific deployment locations and configuration. For example, if two or more airborne detection devices are located in close proximity to each other, one airborne detection device may include satellite communication equipment along with radio or wireless communication equipment, while the other airborne detection devices may include only radio or wireless communication equipment. In this manner, the airborne detection device with the satellite communication equipment may handle communication to the command unit 520 for the other airborne detection devices.

Further, it should be appreciated that the remote controlled device may be different devices. For example the remote controlled device may include a remote controlled boat, a remote controlled submarine, a remote controlled helicopter, a remote controlled airplane and/or a remote controlled dirigible as the remote controlled device. Each of these being an unmanned device, which is not operated by a user within the housing of the remote controlled device. Further, the remote controlled device may include various components that may be distributed throughout the housing to perform the different tasks. These components may be enclosed within the housing, which means that the component may be completely enclosed within the housing, partially enclosed within the housing and/or attached to the housing for different embodiments. As an example, the camera may include a lens that extends outside the housing of the remote controlled device, while the remainder of the camera components may be disposed within the housing. Also, the herder delivery component may be attached externally to the housing of the remote controlled device, but in communication with the operator of the remote controlled device directly or through the remote controlled device. As another embodiment, the herder delivery component may include certain components that are part of the housing for the remote controlled device or attached externally to the housing, such as nozzles and a tank, while other control components of the herder delivery component are internal to the housing. Further still, the incendiary delivery component may include a door that is part of the housing and/or be a separate module that is attached externally to the housing of the remote controlled housing. The configuration of these components may depend upon the different design considerations.

Figure 6:
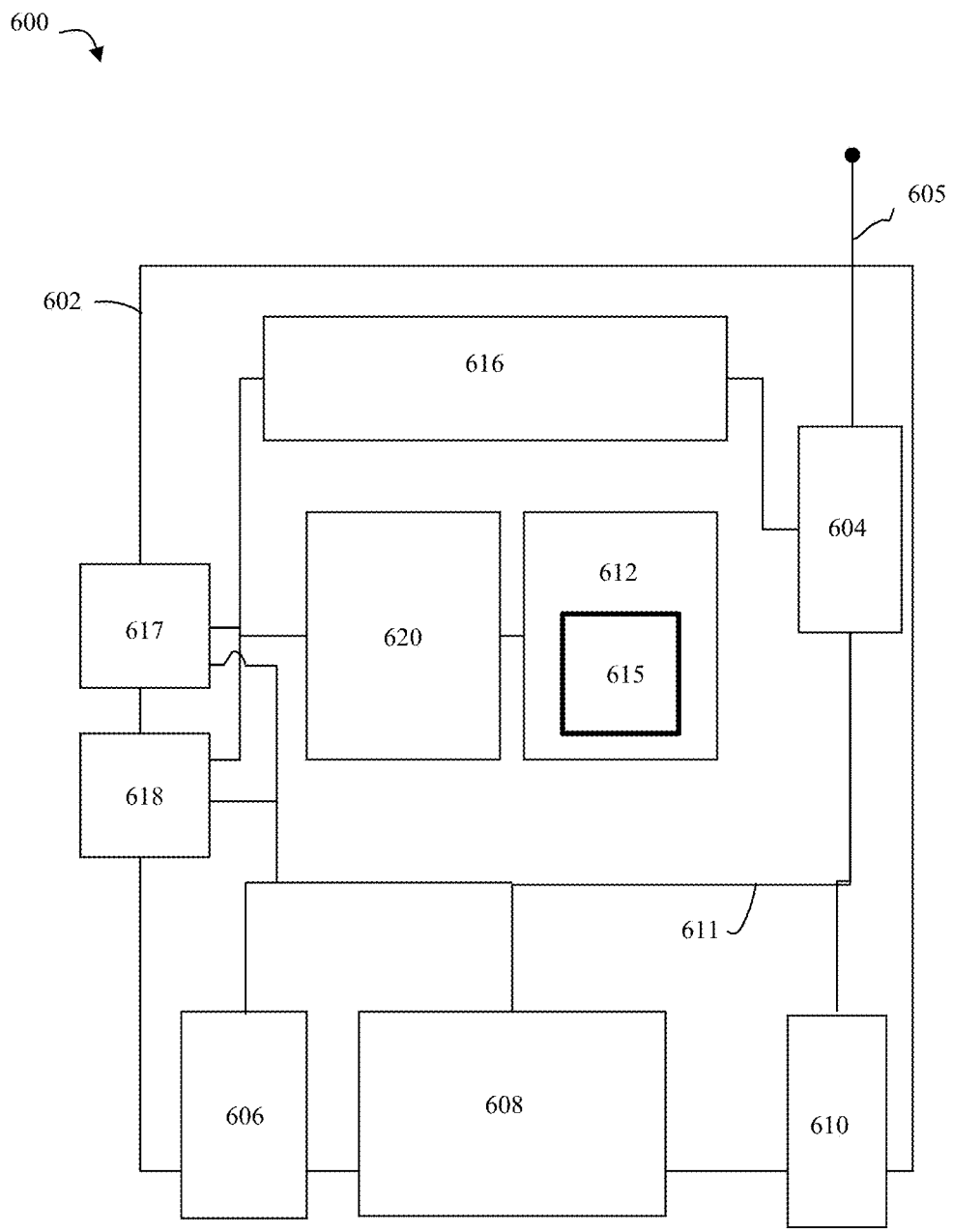
FIG. 6 is a diagram of an airborne remote controlled oil release management system in accordance with an exemplary embodiment of the present techniques.

As an example, FIG. 6 is an exemplary remote controlled device 600, which may be one embodiment of the airborne remote controlled device 410 of FIG. 4 or 510 of FIG. 5. In FIG. 6, the exemplary remote controlled device 600 includes a housing 602 that encloses or partially encloses a herder delivery component 617 and an incendiary delivery component 618. The housing may also enclose one or more of a communication component 604 and associated antenna 605, a high definition (HD) camera 606, a thickness measurement component 608, an infrared (IR) camera 610, a power component 612, a propulsion component 616, and a computer component 620. The modules and components are provided power from the power component 612 via power distribution lines (not shown). Similarly, the different modules and components may communicate with each other via communication lines 611. This embodiment utilizes central power and communication lines to manage the operation in an efficient manner.

To operate, the power component 612 may be utilized to supply power to the propulsion component 616. Further, the power component 612 may provide power to the communication component 604, the high definition (HD) camera 606, the thickness measurement component 608, the infrared (IR) camera 610, the herder delivery component 617, the incendiary delivery component 618, and the computer component 620. In this embodiment, the power component 612 includes batteries 615 and a motor (not shown). The batteries 615 may provide power via the power distribution lines, which may include one or more cables, as an example. The motor may turn fuel into power, which may be used to power the modules and components and also to recharge the batteries 615.

The computer component 620 may include one or more processors, memory accessibly by the processor and sets of instructions, when executed by the processor, may perform certain functions. The computer component 620 may be configured to perform operations of the remote controlled device automatically. It can serve as the primary mode of operation or as a backup in case of communication failure with the command unit. The computer component 620 can control the communication component 604, the high definition (HD) camera 606, the thickness measurement component 608, the infrared (IR) camera 610, the herder delivery component 617, the incendiary delivery component 618

The communication component 604 is utilized to exchange information between the different modules and components and/or the command unit via the communication lines 611 and the communication antenna 605. The communication component 604 may utilize the communication lines 611 to handle the exchange of information, such as measured data, status indications or other notifications, between the modules, such as the high definition (HD) camera 606, the thickness measurement component 608, the infrared (IR) camera 610, the power component 612, the propulsion component 616, the herder delivery component 617 and the incendiary delivery component 618. The communication lines 611 may include a bus, Ethernet cable, fiber optics or other suitable physical connection. In an alternative embodiment, the communication between modules may be via a wireless connection. Similarly, the communication protocol may be any protocol known to those skilled in the art.

To monitor and/or measure the oil slick, the high definition (HD) camera 606, the thickness measurement component 608, and the infrared (IR) camera 610 may be utilized to measure spatial distribution or thickness of the oil slick. Examples of different measurement components and the associated techniques to obtain measurements are noted further below. As an example, the thickness measurement component 608 may include a loading component to load a Secchi-type disk, weight or similarly visible object, a wench component to raise and lower a camera, sample tube, weight, object, accelerometer, conductivity probe and the like. The cameras 606 and 610 may be used with the measurement component 608 to assist in imaging, measuring or determining the oil slick thickness. The various measurement techniques are described further above.

To deploy the herders, the herder delivery component 617 may be utilized to spray herders near the oil slick. Examples of different herder delivery component and the associated techniques to deploy the herders may include a component to store the herder either inside or outside the housing component 602, a pump component that transfers the herder to an external delivery system. The external delivery system can be a boom fitted with one or more nozzles capable of spraying the herder. Alternatively, the external delivery system can be a coiled tubing wound on a reel that can be extended externally from the remote controlled device to allow the herder to be delivery within 1 inch or less of the water surface, within 1 feet or less of the water surface, within 10 feet or less of the water surface, or greater than 10 feet of the water surface. As an example, the herder delivery component may operate by first loading the storage component with herder, then transferring the remote controlled device to an oil slick and activating the pumping component to transfer herder to the external delivery component composed of one or more booms fitted with one or more nozzles. The remote controlled device may then maneuver around the perimeter of the slick spraying the herder from the one or more nozzles in a manner the applies the herder to the water surface on the perimeter of the oil slick avoiding overspray of the herder onto the oil slick. Preferably, the entire water surface around the perimeter of the slick may be sprayed.

To ignite the oil slick and/or herders, the incendiary delivery component 618 may be utilized to provide the incendiary devices to the oil slick. Examples of different incendiary delivery components 618 and the associated techniques to deploy the incendiaries may include marine flares (including a method of maintaining the flare buoyancy and a method of ignition), lasers, gelled gasoline, gelled kerosene, gelled diesel, metallic sodium, metallic potassium, potassium permanganate/ethylene glycol mixture, or other appropriate ignition system. As an example, once the herders are applied to the water surface around the perimeter of an oil slick, the oil slick contracts and thickens. Then, the remote controlled device with maneuver to the upwind edge of the oil slick, and once in position, the incendiary delivery component 618 ignites and/or releases one or more packets of gelled gasoline. The gelled gasoline may land on or near the upwind edge of the oil slick. The heat from the gelled gasoline may ignite the herder and/or oil slick. The wind may then cause the flames to propagate downwind to ignite and burn the entire slick.

Referring back to FIGS. 4 and 5, the command unit 436 and 520 may be utilized as a central location to manage the one or more remote controlled devices. The command unit 436 and/or 520 may include power components, communication components and/or management components. Each of the command units 436 and/or 520 may be disposed on a vessel, such as a manned helicopter 430 or a ship 522, to facilitate communication and interaction with the remote controlled devices. However, other embodiments may include the command unit being located at an onshore location, on a platform, or other remote location.

Similar to the airborne remote controlled device 410 in FIGS. 4 and 510 in FIG. 5, the power components may include a battery and/or solar powered equipment. Further, the power components for the each of command units 436 in FIGS. 4 and 520 in FIG. 5 may also include turbines and/or engines. That is, the command unit may be disposed on a vessel, such as ship 522, which may include motors that supply power to equipment on the ship 522.

The communication components may include communication equipment that is utilized with one or more antenna to communicate with one or more other airborne detection devices and other operation centers. The communication equipment may utilize technologies, such as radio, cellular, wireless, microwave or satellite communication hardware and software. Also, the command unit may utilize Ethernet communications, such as local area networks or wide area networks.

The management components may include different modules, which may include hardware, sets of instructions stored in memory and configured to be accessed by a processor to execute the set of instructions, or a combination of both. These modules may include display and imaging module that present the images or visible indications to an operator, and modules configured to determine the thickness of the oil slick. Persons skilled in the technical field will readily recognize that in practical applications of the disclosed methodology, it is partially performed on a computer, typically a suitably programmed digital computer. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the present techniques can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

Further, one or more embodiments may include methods that are performed by executing one or more sets of instructions to perform operations in the various stages. These sets of instructions can reside on the computer component located on the remote control device or on a computing component located in the command unit. For example, the method may include executing one or more sets of instructions to perform locating the oil slick, m As an example, a computer system may be utilized and configured to implement on or more of the present aspects. The computer system may include a processor; memory in communication with the processor; and a set of instructions stored on the memory and accessible by the processor, wherein the set of instructions, when executed, are configured to: receive the transmitted signal from the airborne remote controlled device; determine the thickness of the oil slick based on the transmitted signal; provide a visible indication of the thickness of the oil slick based on the determination; deploy the herders based on a transmitted signal and/or location relative to the oil slick, and deploy the incendiary devices based on a transmitted signal and/or location relative to the oil slick. Further, the determination of the thickness of the oil slick based on the transmitted signal may comprise a set of instructions, when executed, configured to: compare a measured time to estimated time table; and display on a monitor the thickness of the oil slick based on this comparison. Further, the determination of the thickness of the oil slick based on the transmitted signal may comprise a set of instructions, when executed, configured to: compare a measured accelerometer data to estimated accelerometer data table; and display on a monitor the thickness of the oil slick based on this comparison. Further still, the determination of the thickness of the oil slick based on the transmitted signal may comprise a set of instructions, when executed, configured to display the image on a monitor to determine the thickness of the oil slick based on this comparison. In addition, the determination of the thickness of the oil slick based on the transmitted signal may comprise a set of instructions, when executed, configured to compare a measured resistance to an estimated resistance table; and display on a monitor the thickness of the oil slick based on this comparison.

In one or more embodiments, the command unit may include a set of instructions stored on the memory and accessible by the processor, wherein the set of instructions, when executed, are configured to provide one or more of a visual indication and audible notification associated with the thickness of the oil slick. Also, the command unit may include a set of instructions stored on the memory and accessible by the processor, wherein the set of instructions, when executed, are configured to store the thickness of the oil slick at the specific location. Further, the command unit may include a set of instruction stored on the memory and accessible by the processor, wherein the set of instruction, when executed, are configured so as to monitor input from the infrared camera to maintain the herder delivery system from delivering herder when the infrared camera detects an elevated temperature that is indicative of an oil slick being located under the remote delivery system. In this manner, the remote controlled device may avoid applying herder to the oil slick itself rather than the water surface, which is desired. Further still, the command unit may include a set of instruction stored on the memory and accessible by the processor, wherein the set of instruction, when executed, are configured so as to cause the remote controlled device to automatically return to its home base.

In one or more embodiments, the command unit may include a set of instructions stored on the memory and accessible by the processor, wherein the set of instructions, when executed, are configured to maneuver the remote controlled device along a predetermined route to locate oil slicks that may be amenable to treatment with herders. Once an oil slick is identified, the command unit is configured to communicate the coordinates of the oil slick back to the command unit. The command unit can then instruct the remote control device to perform a set of instructions that cause the remote control device to apply herder to the water on the perimeter of the oil slick, monitor the oil slick as it contracts and thickens, perform measurements of the oil thickness of the thickened slick, and drop incendiary devices onto the upwind edge of the thickened oil slick.

In one or more embodiments, the command unit in the remote controlled devices may include other enhancements. For example, the command unit may be configured to perform various tasks automatically. That is, the command unit may be configured to perform one or more operations independent of direct communication (e.g., with the manned aircraft or manned boat). As an example, if the remote controlled device loses communication with the command unit, it may perform instructions to perform one or more of locating the oil slick, moving to a location near the oil slick, measuring the oil slick, applying herders near the oil slick, igniting the oil slick, and monitoring the ignited oil slick. Further, the command unit may also include a global positioning system (GPS) to obtain the oil slick information (e.g., store GPS location data for the oil slick). That is, the GPS location may be used to maneuver the remote controlled device to the oil slick, map the oil slick before the herders are deployed, map the oil slick after the herders are deployed, and/or map the oil slick after ignition.

Further still, one or more embodiments may include a combination of remote controlled devices. In particular, airborne remote controlled devices may be utilized with marine remote controlled devices to manage the oil slick. These devices may communicate with each other to manage the oil slick and/or may be operated independently. As an example, the system may include one airborne remote controlled device that is operated with a marine remote controlled device. These devices may be utilized to divide the operations in a manner that enhances efficiency. As another example, the system may include one airborne remote controlled device that is operated with a plurality of marine remote controlled devices. In this manner, the airborne remote controlled device may be utilized to ignite the oil slick and monitor the oil slick, while the plurality of marine remote controlled devices may be used to deploy the herders. This may remove the additional weight of the herders from the airborne remote controlled device, which may increase the flight time for that device.

Also, as another example, the system may include one airborne remote controlled device that is operated to interact with a plurality of oil slicks, while each oil slick is associated with one or more of a plurality of marine remote controlled devices. This provides additional flexibility for the airborne remote controlled device to manage a plurality of oil slicks.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. The articles "the", "a" and "an" are not necessarily limited to mean only one, but rather are inclusive and open ended so as to include, optionally, multiple such elements.

The invention claimed is:

1. A method for managing an oil release with one or more remote controlled devices, comprising:
    deploying a remote controlled device to a location near an oil slick;
    deploying herders around at least a portion of the perimeter of the oil slick via the remote controlled device; and
    igniting the oil slick with one or more incendiary devices.

2. The method of claim 1, comprising deploying a vessel having the remote controlled device to a location in a body of water near the oil slick; and wherein the deploying the remote controlled device is from the vessel.

3. The method of claim 2, wherein the vessel is a manned ship or a manned aircraft.

4. The method of claim 2, comprising transmitting a signal associated with the thickness of the oil slick to a command unit on the vessel; and determining whether to deploy the herders based on the determined thickness of the oil slick.

5. The method of claim 1, comprising outfitting the remote controlled device with a supply of herder and a herder delivery component.

6. The method of claim 1, comprising outfitting the remote controlled device with a supply of incendiary devices and an incendiary device delivery component.

7. The method of claim 1, comprising measuring in real-time the oil slick from the remote controlled device via a measurement component.

8. The method of claim 1, wherein deploying a remote controlled device comprises flying the remote controlled device to a location on the perimeter of an oil slick.

9. The method of claim 1, wherein deploying a remote controlled device comprises navigating the remote controlled device at least partially in the body of water to a location on the perimeter of an oil slick.

10. The method of claim 1, comprising identifying a second oil slick and performing the steps of deploying the remote controlled device from the vessel to a location near the second oil slick; deploying herders around a portion of the perimeter of the second oil slick via the remote controlled device; and igniting the second oil slick with one or more incendiary devices.

11. The method of claim 1, comprising retrieving samples of the oil slicks after the in situ burn.

12. The method of claim 1, comprising spraying the herders via one or more nozzles in fluid communication with a storage tank that is mounted on the remote controlled device.

13. The method of claim 2, comprising transmitting a signal associated with the thickness of the oil slick to a command unit.

14. The method of claim 13, further comprising programming the remote controlled device to communicate with the command unit prior to deploying the remote controlled device from the vessel.

15. The method of claim 1, comprising measuring thickness of the oil slick from the remote controlled device prior to igniting the oil slick.

16. The method of claim 15, wherein the measuring the thickness of the oil slick comprises using down wash from the remote controlled device to clear an area within the oil slick, and recording a clearing time.

17. The method of claim 15, wherein the measuring thickness of the oil slick comprises dropping a Secchi-type disk into the oil slick, measuring a time period for a camera mounted on the remote controlled device to lose sight of the disk from the initial dropping of the Secchi-type disk.

18. The method of claim 15, wherein the measuring thickness of the oil slick comprises dropping an accelerometer into the oil slick to measure the amount of time required for the accelerometer to pass through the oil slick; and retracting the accelerometer out of the oil slick.

19. The method of claim 15, wherein the measuring thickness of the oil slick comprises dropping a small visible weight into the oil slick; recording the amount of time for the small visible weight to pass through the oil slick based on a loss of visibility, and retracting the small visible weight out of the oil slick.

20. The method of claim 15, wherein the measuring thickness of the oil slick comprises lowering a sample tube until the sample tube extends from above the oil slick to a location below the oil slick, closing the ends of the sample tube, retracting the sample tube from the oil slick, and obtaining an image of the filled sample tube.

21. The method of claim 15, wherein the measuring thickness of the oil slick comprises lowering an imaging camera into the oil slick to photograph a profile of the air-oil-water interfaces, capturing the image and retracting the imaging camera out of the oil slick.

22. The method of claim 15, wherein the measuring thickness of the oil slick comprises lowering a conductivity probe into the oil slick and through the oil slick to the water beneath the oil slick, measuring resistance of the oil and water phases, and retracting the conductivity probe.

23. A method for managing an oil release with one or more remote controlled ships, comprising:
    outfitting the remote controlled ships with a supply of herder and an application system;
    outfitting the remote controlled ships with a supply of incendiary devices and a delivery system;
    outfitting the remote controlled ships with a remote-detection system to provide real time remote observation of the environment around the one or more remote controlled ships;
    deploying a vessel having at least one of the one or more remote controlled ships to a location in a body of water near an oil slick;
    maneuvering the at least one of the one or more remote controlled ships to a location on the perimeter of an oil slick;
    applying the herder while maneuvering the remote controlled ship around the perimeter of the oil slick;
    interrupting the application of the herder after the perimeter has been circled once;

maneuvering the at least one of the one or more remote controlled ships to observe the oil slick until it reaches a threshold size; and igniting the oil slick with one or more incendiary devices.

24. A method of managing a hydrocarbon release comprising:

deploying a manned aircraft to a location near an oil slick;

deploying herders around at least a portion of the perimeter of the oil slick via the manned aircraft; and igniting the oil slick with one or more incendiary devices deployed from the manned aircraft.

* * * * *